United States Patent [19]

Lookholder

[11] Patent Number: 4,620,633

[45] Date of Patent: Nov. 4, 1986

[54] PROTECTIVE ENVELOPE DEVICE FOR PACKAGING FRAGILE ARTICLES

[76] Inventor: Theodore W. Lookholder, 1262 Barrington, #304, Los Angeles, Calif. 90025

[21] Appl. No.: 781,759

[22] Filed: Sep. 30, 1985

[51] Int. Cl.$^4$ .............................................. B65D 81/20
[52] U.S. Cl. ........................... 206/523; 206/524; 206/524.8; 53/405; 53/403
[58] Field of Search .............. 206/524.8, 524, 523; 53/405, 403, 427, 432, 433

[56] References Cited

U.S. PATENT DOCUMENTS

| | | | |
|---|---|---|---|
| 3,130,089 | 4/1964 | Mellinger | 206/524.8 |
| 3,464,540 | 9/1969 | Stark | 206/524 |
| 3,503,177 | 3/1970 | Kropscott et al. | 206/524 |
| 3,613,879 | 10/1971 | Kemble | 206/524.8 |
| 4,193,499 | 3/1980 | Lookholder | 206/524 |
| 4,401,218 | 8/1983 | Erlichman | 206/524.8 |
| 4,411,364 | 10/1983 | Friedman | 206/524.8 |
| 4,449,632 | 5/1984 | Marosiak, Jr. | 206/524.8 |

Primary Examiner—Joseph Man-Fu Moy
Attorney, Agent, or Firm—Robert Louis Finkel

[57] ABSTRACT

A unitary protective envelope device for packaging fragile articles has an outer wall and a conformable inner wall. A mass of compressed resilient open-celled cellular material is enclosed in the space between the walls and held in compressed condition under vacuum. The material upon exposure to atmospheric pressure expands, forcing the inner wall conformingly against articles in the envelope and converting the envelope into an impact-absorbing pod embracing and conforming closely to its contents. In one preferred embodiment a compressed slab of open-celled foam held in compressed condition in a vacuum-sealed sack positioned between the walls expands to embrace the contents of the envelope when the sack is punctured.

16 Claims, 9 Drawing Figures

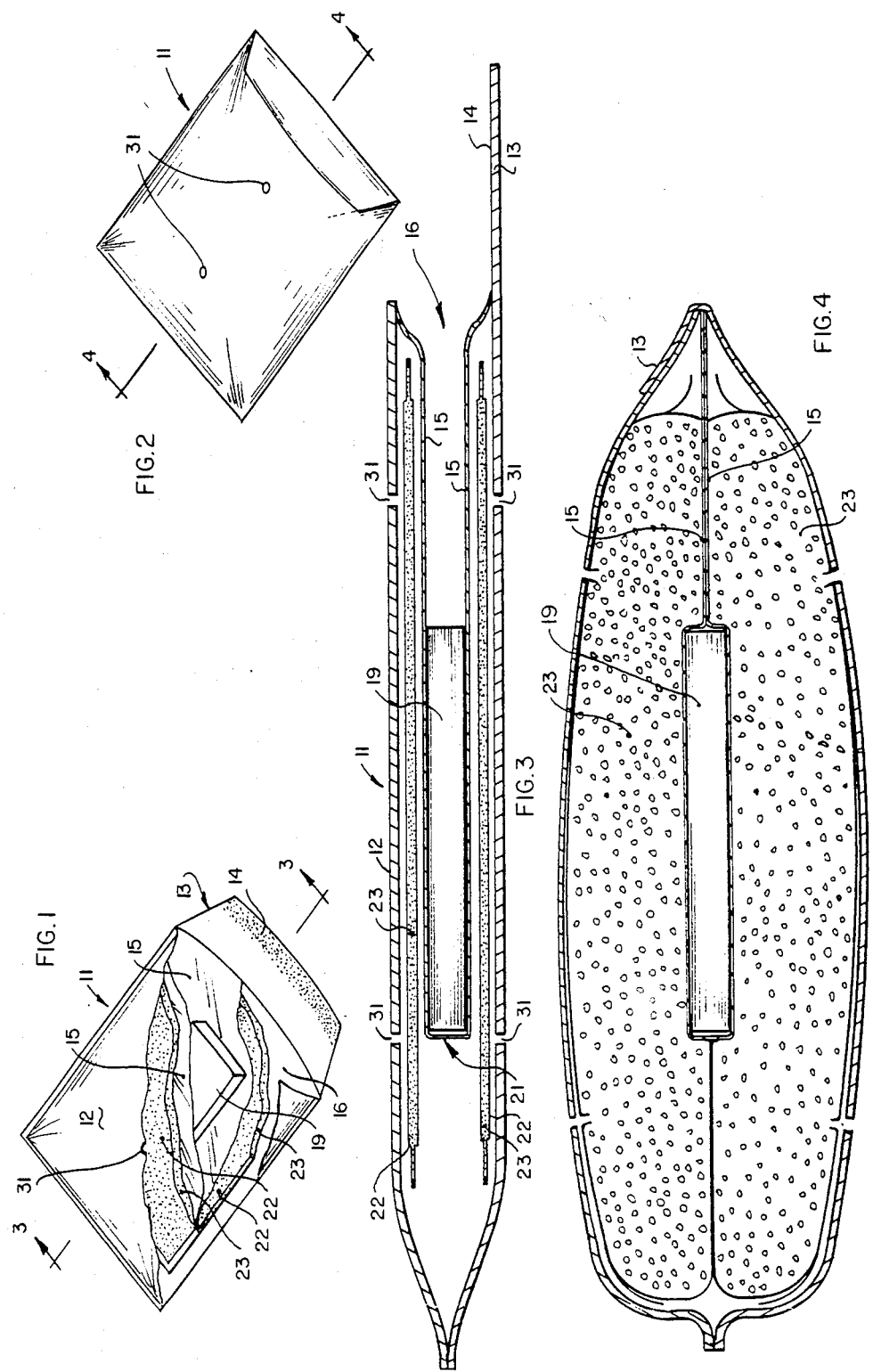

PROTECTIVE ENVELOPE DEVICE FOR PACKAGING FRAGILE ARTICLES

BACKGROUND OF THE INVENTION

1. Field of the Invention

This invention relates to impact-absorbing packaging devices, and more particularly, to containers employing yieldable packing material to protect fragile articles from damage by impact during shipping and storage.

2. Prior Art

Prior art impact-absorbing packaging devices for shipping and storing fragile articles fall into four broad categories: In one type of device, the articles are loosely enclosed in a flexible envelope the walls of which are padded with laminated pulverized paper, plastic air bubbles, foam, or similar resilient material. In another, the articles are enclosed in a rigid container and surrounded by a loose fill of impact-absorbing material, such as small pieces of polystyrene foam, shredded newspaper, excelsior, sawdust, or the like, which is intended to cushion them from shock. In a third type, shock-absorbing rigid inserts, such as die-cut paperboard, or wooden or plastic forms, or flexible inserts, such as cushioning sacks containing resilient synthetic plastic foam, support the articles in a rigid container. In a fourth type, the articles are encapsulated in a molded form-fitting shell of crushable material, such as polystyrene foam, which is generally enclosed in a rigid container.

My U.S. Pat. No. 4,193,499, issued Mar. 18, 1980, contains examples of each of these types of packaging systems and a discussion of their respective advantages and limitations. As pointed out there, by reason of those limitations none of the prior art systems satisfactorily fills the need for a convenient effective self-contained impact-absorbing shipping or storage device suitable for low-volume packaging operations or the occasional industrial packaging task.

The invention disclosed in U.S. Pat. No. 4,193,499 is specifically intended to satisfy this need. It comprises a prefabricated double-walled envelope in which expandable material enclosed in the space between the walls is caused to expand, thereby converting the device into an impact-absorbing pod closely conforming to articles sealed in it. In one embodiment of the invention the protective pod is formed by exposing a mixture incorporating polystyrene beads and a blowing agent to microwave radiation. The subject invention offers an alternative method and means for achieving substantially the same result.

BRIEF SUMMARY OF THE INVENTION

In the present invention a protective envelope device for packaging fragile articles is constructed with an outer protective wall, and a pliable inner wall capable of conforming to articles sealed within the device.

In one preferred embodiment a slab of compressed resilient open-celled cellular material, such as synthetic plastic foam, hermetically sealed in a pliable plastic pouch and held in compressed condition under vacuum, is enclosed in the space between the walls. With an article to be protected sealed in the envelope, the pouch is punctured, exposing the compressed material to atmospheric pressure and allowing it to expand to its impact-aborbing state, thereby forcing the inner wall conformingly against the enclosed article. In this condition the envelope serves as a resilient impact-absorbing pod embracing and conforming closely to the contents.

In another embodiment a pouch holding the compressed material is formed by joining adjacent edges of the outer and inner walls, and sealed under vacuum to retain the material in compressed condition.

The principles, features, and advantages of the invention will be more fully disclosed in the following detailed description of the preferred embodiments illustrated in accompanying drawing in which:

DESCRIPTION OF THE DRAWING

FIG. 1 is a top perspective view of a typical envelope device made in accordance with the invention, with portions cut away to show its internal construction and the positioning of an article prior to exposing the compressed material to atmospheric pressure;

FIG. 2 is a top perspective view of the envelope device of FIG. 1 after it has been sealed and the previously compressed material exposed to atmospheric pressure;

FIG. 3 is an enlarged sectional view taken along the line 3—3 of FIG. 1;

FIG. 4 is an enlarged sectional view taken along the line for 4—4 of FIG. 2;

DETAILED DESCRIPTION OF THE PREFERRED EMBODIMENTS

Figure 7:
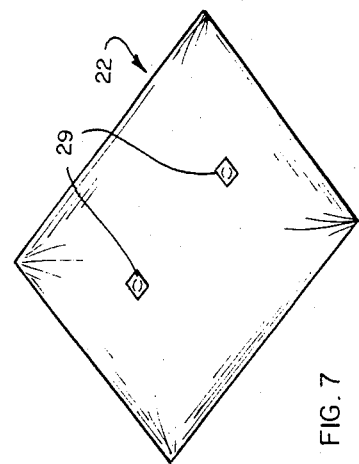
FIG. 7 is a top perspective view of the foam block of FIG. 6, showing the foam compressed and held in compressed condition under vacuum.

Referring to FIGS. 1 and 3, one preferred embodiment of the invention takes the form of an outwardly conventional-appearing shipping envelope 11 having an encircling outer wall 12 of durable material, such as 100 lb. Kraft paper, or sheets or laminates of "Tyvek" polyethelene- or metallized "Mylar" ester-based film. I have found a laminate of 1 mil "Tyvek" film bonded to 100 lb. Kraft paper to be especially suitable, since the latter's heat-sealing properties allow the envelope to be manufactured without the use of adhesives.

One edge of the outer wall 12 adjacent the open end of the envelope 11 is extended beyond the opening to serve as a flap 12, the inner surface of which may be coated with an adhesive 14 for sealing the opening.

Internally, the envelope 11 is provided with an inner wall 15 of pliable material, such as 60 lb. (or lighter) Kraft paper, capable of conforming closely to the outer surface of articles enclosed in the envelope 11. I have used "Tyvek" and "Mylar" films, as well as laminates of light-weight Kraft paper with synthetic films for this purpose with excellent results.

Inner wall 15 is either continuous with the outer wall 12, or is joined with the inner surfaces of outer wall 12 forming the mouth 16 of the envelope 11. Thus, inserting an article 19 into envelope 12 through its mouth 16 positions the article 19 between opposing faces of inner wall 15.

Preferably, although not necessarily, inner wall 15 is adapted to form an enclosed pouch within envelope 11. For some applications it may be advantageous to construct inner wall 15 in two opposing sections which are joined only in the area 21 remote from the mouth 16.

Slabs 22 of compressed resilient impact-absorbing material 23 are enclosed in the spaces between outer wall 12 and inner wall 15.

The material 23 may be any suitable natural or synthetic resiliently compressable open-celled cellular material, such as natural sponge, sponge rubber, or polyurethane, polyester, polyethelene or cellulose foam. As will be seen, in its normal expanded condition the material 23 may be a solid block, or it may be in the form of bonded or unbonded fragments. I have achieved very satisfactory results using open-celled polyurethane ether foam with an ILD (identifiable load deflection) between 9 and 80 and a density range from 0.85 lbs./cu. ft. to 2.5 lbs./cu. ft., in solid block and in bonded and unbonded chip form. Typically, a block of polyurethane foam two inches thick can be compressed to form a slab having a thickness of a quarter of an inch.

The material 23 in slabs 22 is maintained under vacuum and is held in compressed condition solely by atmospheric pressure. Several methods which may be employed to achieve this result are illustrated by FIGS. 5–7.

Figure 5:
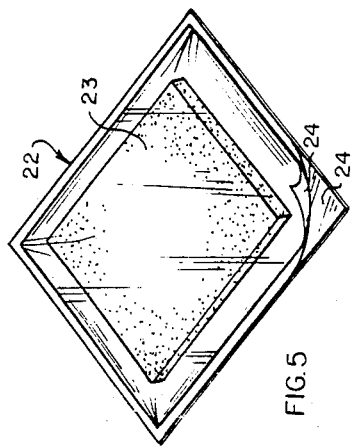
FIG. 5 is a top perspective view of an hermetically sealed pouch holding a slab of compressed resilient material in compressed condition under vacuum.

FIG. 5 shows a typical slab 22, formed by compressing a block of polyurethane foam 23 between sheets 24 of pliable non-porous material, such as polyester, polyethelene, rubber, or the like, in a press. When compression has forced substantially all the air from the cellular material, and while the material 23 is in the compressed state, the periphery of the sheets 24 is hermetically sealed by conventional means, such as thermal bonding or adhesives. Care is taken to ensure that there is sufficient unsealed sheet material surrounding the compressed material 23 to allow the material 23 to expand fully to its original size and shape, upon its exposure to atmospheric pressure. To facilitate the manufacturing process, the material 23 may be enclosed in a pliable container or pouch, rather than sandwiched between separate sheets, thus reducing the amount of sealing required.

Normally, sufficient air is expelled by compression alone for atmospheric pressure to hold the material 23 in the compressed state. If desired, however, expulsion of the entrapped air may be facilitated and augmented by applying a vacuum to the material 23 at some point in the foregoing procedure, prior to finally sealing the pressure vessel containing the material 23.

Figure 6:
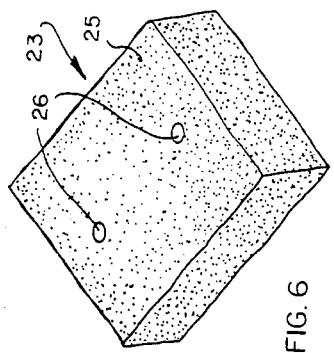
FIG. 6 is a top perspective view of a block of expanded synthetic plastic foam completely covered, save for two exhaust ports, with a pliable airtight coating of plastic material.

FIGS. 6 and 7 illustrate the successive steps of an alternate technique for producing slabs of compressed impact-absorbing material. FIG. 6 depicts a block of such material 23, to which a thin pliable airtight coating 25 has been applied. A suitable material, such as latex or one of the conventional synthetic plastic polymers, may be applied directly to the surface of the material 23 by dipping, spraying, or other well known means.

Openings 26 through coating 25 allow air to be expelled when the encapsulated block is compacted in a press. As shown in FIG. 7, once the material 23 is compressed, openings 26 are sealed, for example by means of patches 29, to prevent air from reentering. As long as coating 25 remains unbroken, the material 23 is held in its compressed condition by the force exerted on it by atmospheric pressure.

Returning to the embodiment of FIGS. 1–4, openings 31 are provided in outer wall 12 to enable the user to puncture the wall of slabs 22 with a convenient pointed instrument, such as the writing tip of a ball-point pen, thereby allowing air at atmospheric pressure to enter the previously sealed vacuum container. FIGS. 2 and 4 illustrate the appearance and condition of the envelope 11 of FIGS. 1 and 3 and enclosed article 19, after mouth 16 has been sealed by flap 13 and the material 23 in slabs 22 exposed to the atmosphere.

Having a resilient "memory", and no longer restrained by atmospheric pressure, the material 23 expands to occupy the space between outer wall 12 and inner walls 15. Restricted from expansion outwardly by outer wall 12, the expanding material 23 exerts resilient force against inner walls 15, forcing them into conforming contact with article 19.

As will be noted, the compressed material 23 in slabs 22 is designed to extend laterally outwardly of the article 19 to be protected. The purpose of this arrangement is to ensure that on expansion the material 23 substantially surrounds and embraces the article 19. It is advantageous, accordingly, not only that the inner walls 15 form a pouch to receive and position article 12, but in addition, that the pouch be of lesser length and width than the outer wall 12 and the compressed material 23, in order to provide space around the enclosed article for the latter to expand.

Effectively, with the material 23 in its expanded condition, the envelope device serves as an impact-absorbing pod embracing and conforming closely with its contents. The the relative stiffness of the pod, an its overall impact-absorbing characteristics can readily be controlled by selection of a material 23 having the appropriate characteristics for the intended application, and by tailoring of the dimensions of the outer wall 12 and the initial size and shape of the material 23 to produce the desired results.

Figure 8:
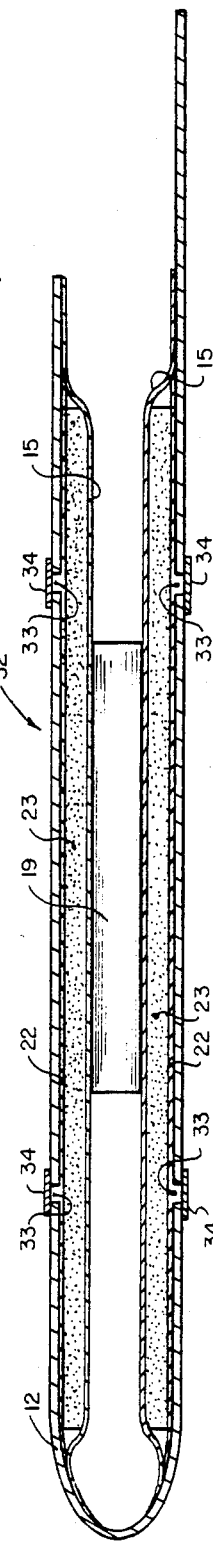
FIG. 8 is a side sectional view of an alternative embodiment of the invention, showing an article positioned in the envelope prior to exposure of the compressed material to atmospheric pressure.
Figure 9:
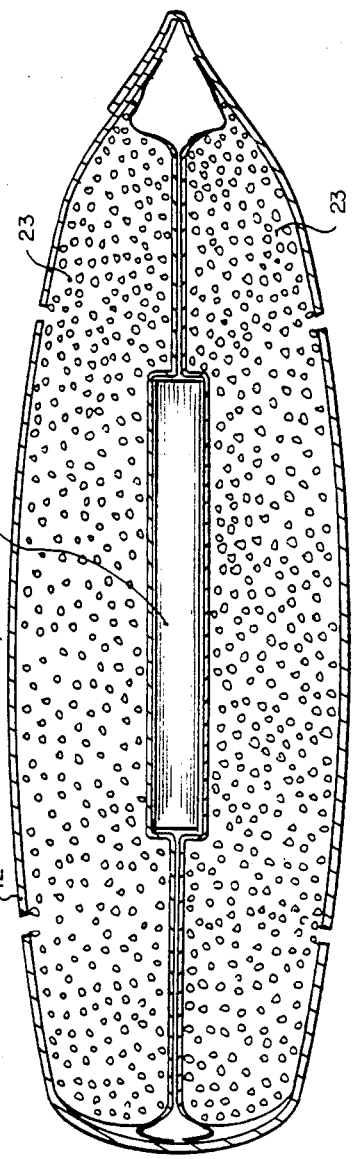
FIG. 9 is a side sectional view of the embodiment of FIG. 8, following exposure of the material to atmospheric pressure.

FIGS. 8 and 9 illustrate an alternative embodiment of the invention. In this construction slabs 22 of compressed impact-absorbing material 23 are hermetically sealed under vacuum in enclosures formed by bonding the inner walls 15 of envelope 32 to outer wall 12, thereby eliminating the need for seperate vacuum enclosures to hold the compressed material 23 in compressed condition.

To facilitate its manufacture, the envelope 32 is provided with ports 33 in outer wall 12, through which air is expelled during the compression of material 23. These ports 33 are sealed with removable patches 34 once the material 23 has been fully compressed. Material 23 is exposed to atmospheric pressure by merely removing the patches 34.

In all other significant respects the embodiment of FIGS. 8 and 9 is identical in structure and operation with that of FIGS. 1–4.

It will be understood that the embodiments illustrated and the features described in this disclosure are offered for exemplary purposes only, and are not to be construed as limiting the scope of the invention as it is defined in the following claims.

I claim:

1. A unitary protective envelope device for packaging fragile articles, comprising:

an envelope adapted to sealably enclose such articles and having an outer wall and a conformable inner wall, said walls defining an expandable cavity therebetween; and a mass of compressed resilient material contained in said cavity and held in compressed condition under vacuum, said mass of material being adapted upon exposure to atmospheric pressure to expand to an impact-absorbing state, and thereby to force said inner wall into embracing conformity with said articles.

2. The envelope device of claim 1, wherein: said resilient material comprises a resilient open-celled cellular material.

3. The envelope device of claim 2, wherein: said resilient material comprises a resilient open-celled foam.

4. The envelope device of claim 2, wherein: said mass of resilient open-celled cellular material is held in compressed condition under vacuum in an hermetically sealed container and is exposed to atmospheric pressure upon puncturing of the enclosure.

5. The envelope device of claim 4, wherein said enclosure comprises a pliable sack.

6. The envelope device of claim 4, wherein said enclosure comprises a pliable coating applied to said material.

7. The envelope device of claim 4, wherein said enclosure includes as an element thereof at least a portion of said inner wall.

8. The envelope device of claim 4, wherein: said inner wall defines a pouch for receiving said articles, said pouch being of lesser length and width than said outer wall; and said mass is of greater length and width than said pouch, whereby on expansion said resilient material substantially surrounds said articles.

9. A method for packaging fragile articles, comprising:

sealably enclosing such articles in an envelope having an outer wall and a comformable inner wall, said walls defining an expandable cavity therebetween and said cavity containing a mass of compressed resilient material held in compressed condition under vacuum and adapted upon exposure to atmospheric pressure to expand to an impact-absorbing state; and exposing said mass of material to atmospheric pressure, thereby causing said material to expand and by such expansion to force said inner wall into embracing conformity with said articles.

10. The method of claim 9, wherein: said resilient material comprises a resilient open-celled cellular material.

11. The method of claim 10, wherein: said resilient material comprises a resilient open-celled foam.

12. The method of claim 10, wherein: said mass of resilient open-celled cellular material is held in compressed condition under vacuum in an hermetically sealed container and is exposed to atmospheric pressure upon puncturing of the enclosure.

13. The method of claim 10, wherein: said enclosure comprises a pliable sack.

14. The method of claim 10, wherein: said enclosure comprises a pliable coating applied to said material.

15. The method of claim 10, wherein: said enclosure includes as an element thereof at least a portion of said inner wall.

16. The method of claim 9, wherein: said inner wall defines a pouch for receiving said articles, said pouch being of lesser length and width than said outer wall; and said mass is of greater length and width than said pouch, whereby on expansion said resilient material substantially surrounds said articles.

* * * * *

UNITED STATES PATENT AND TRADEMARK OFFICE
CERTIFICATE OF CORRECTION

PATENT NO. : 4,620,633
DATED : November 4, 1986
INVENTOR(S) : Theodore W. Lookholder It is certified that error appears in the above-identified patent and that said Letters Patent is hereby corrected as shown below:

Column 5, line 21, "container" should read --enclosure--.

Column 6, line 22, "container" should read --enclosure--.

Signed and Sealed this

First Day of March, 1988

*Attest:*

DONALD J. QUIGG

*Attesting Officer*  *Commissioner of Patents and Trademarks*